US011794397B2

(12) United States Patent
Dabadie et al.

(10) Patent No.: US 11,794,397 B2
(45) Date of Patent: Oct. 24, 2023

(54) HEAT-STABLE, BIAXIALLY ORIENTED, POLYPROPYLENE FILMS

(71) Applicant: Jindal Films Americas LLC, LaGrange, GA (US)

(72) Inventors: Thierry J. L. Dabadie, Luxembourg (LU); Gabriel Domingos, Allondrelle-la-Malmaison (FR); Alain Marchal, Villers-le-Rond (FR); François Gastineau, Letzebuerg (LU)

(73) Assignee: Jindal Films Americas LLC, LaGrange, GA (US)

( * ) Notice: Subject to any disclaimer, the term of this patent is extended or adjusted under 35 U.S.C. 154(b) by 14 days.

(21) Appl. No.: 17/376,841

(22) Filed: Jul. 15, 2021

(65) Prior Publication Data
US 2021/0347101 A1    Nov. 11, 2021

Related U.S. Application Data

(63) Continuation of application No. PCT/US2020/042002, filed on Jul. 14, 2020.

(60) Provisional application No. 62/875,022, filed on Jul. 17, 2019.

(51) Int. Cl.
*B29C 48/22* (2019.01)
*B29C 48/88* (2019.01)
*B29C 48/08* (2019.01)
*B29C 48/90* (2019.01)
*B29C 48/91* (2019.01)
*B29K 23/00* (2006.01)

(52) U.S. Cl.
CPC ............ *B29C 48/22* (2019.02); *B29C 48/08* (2019.02); *B29C 48/90* (2019.02); *B29C 48/91* (2019.02); *B29C 48/914* (2019.02); *B29K 2023/12* (2013.01); *B29K 2023/14* (2013.01); *B29K 2023/16* (2013.01); *B29K 2995/004* (2013.01); *B29K 2995/0041* (2013.01); *B29K 2995/0053* (2013.01)

(58) Field of Classification Search
CPC ............... B29C 48/22; B29K 2023/12; B29K 2023/14; B29K 2023/16
See application file for complete search history.

(56) References Cited

U.S. PATENT DOCUMENTS

| 5,152,946 A * | 10/1992 | Gillette ............... B29C 71/02 264/235.8 |
| 5,902,684 A * | 5/1999 | Bullard ............... B32B 27/08 53/399 |
| 6,339,128 B1 * | 1/2002 | Nakayama ............ C08L 23/10 525/240 |
| 6,863,964 B2 | 3/2005 | Migliorini et al. |
| 8,557,919 B2 * | 10/2013 | Song ................. B29C 48/90 528/308.1 |
| 9,453,598 B2 | 9/2016 | Leiden et al. |
| 2002/0146520 A1 | 10/2002 | Squier et al. |
| 2004/0137206 A1 * | 7/2004 | Pettis ................. B32B 27/32 428/212 |
| 2007/0059545 A1 * | 3/2007 | Emiliani ............. B32B 27/08 428/515 |
| 2013/0065019 A1 | 3/2013 | Campeau et al. |
| 2016/0167347 A1 | 6/2016 | Jung et al. |

OTHER PUBLICATIONS

Copenheaver, Blaine R., International Search Report and Written Opinion on PCT/US20/42002, dated Oct. 9, 2020, USPTO as RO for WIPO, Alexandria, US.
Osterrieder, Erik J., Demand on PCT/US20/42002, dated May 14, 2021, Houston, US.

* cited by examiner

*Primary Examiner* — Margaret G Moore
(74) *Attorney, Agent, or Firm* — Kearney, McWilliams & Davis; Erik J. Osterrieder

(57) ABSTRACT

In one example embodiment, disclosed is a biaxially oriented multilayer film, which may include a first tie layer and a second tie layer, wherein each has an inside surface and an outside surface. The film's core layer may consist of: (i) at least 50 wt. % high-crystalline polypropylene; (ii) both cyclic olefin copolymer and polypropylene homopolymer, or, polypropylene heterophasic copolymer; (iii) and, optionally, additives, wherein the core layer is between the inside surface of the first tie layer and the inside surface of the second tie layer. The film may also include a first skin layer on the outside surface of the first tie layer and a second skin layer on the outside surface of the second tie layer, wherein shrinkage is less than 3.5% in a transverse direction for the biaxially oriented multilayer film after subjecting the biaxially oriented multilayer film to 135° C. for 7 min at 1 atm.

20 Claims, 10 Drawing Sheets

FIGURE 3A

| Rep 1 | | | | Shrinking | Temperature around |
|---|---|---|---|---|---|
| Film | Sens | Time(s) | Force(daN) | ratio(%) | sample (°C) |
| var#2.13 | MD | 10 | -0.001 | -0.4 | 104 |
| | | 20 | -0.001 | -0.4 | 117 |
| | | 30 | -0.001 | -0.4 | 120 |
| | | 41 | -0.001 | -0.4 | 121 |
| | | 50 | -0.001 | -0.4 | 122 |
| | | 75 | -0.001 | -0.4 | 126 |
| | | 90 | -0.001 | -0.4 | 124 |
| | | 105 | -0.001 | -0.4 | 125 |
| | | 120 | -0.001 | -0.4 | 126 |
| | | 150 | -0.001 | -0.4 | 126 |
| | | 180 | -0.001 | -0.4 | 125 |
| | | 210 | -0.001 | -0.4 | 128 |
| | | 240 | -0.001 | -0.4 | 128 |
| | | 300 | -0.002 | -0.4 | 130 |
| | | 360 | -0.002 | -0.4 | 130 |
| | | 600 | -0.002 | -0.4 | 130 |
| | | 900 | -0.002 | -0.4 | 130 |
| | | 1200 | -0.003 | -0.4 | 130 |
| | | 1500 | -0.003 | -0.4 | 130 |
| | | 1800 | -0.003 | -0.4 | 130 |
| | Cooling | 1801.00 | 0 | -0.3 | 120 |
| | | | 0 | 0.4 | 113 |
| | | | 0.003 | 0.5 | 102 |
| | | | 0.01 | 0.6 | 95 |
| | | | 0.019 | 0.7 | 86 |
| | | | 0.026 | 0.8 | 75 |
| | | | 0.033 | 0.8 | 69 |
| | | | 0.044 | 0.8 | 61 |
| | | | 0.054 | 0.8 | 55 |
| | | | 0.079 | 0.8 | 46 |
| | | | 0.085 | 0.8 | 36 |
| | | | 0.079 | 0.8 | 25 |
| | | 1828.00 | 0.079 | 0.8 | 23 |

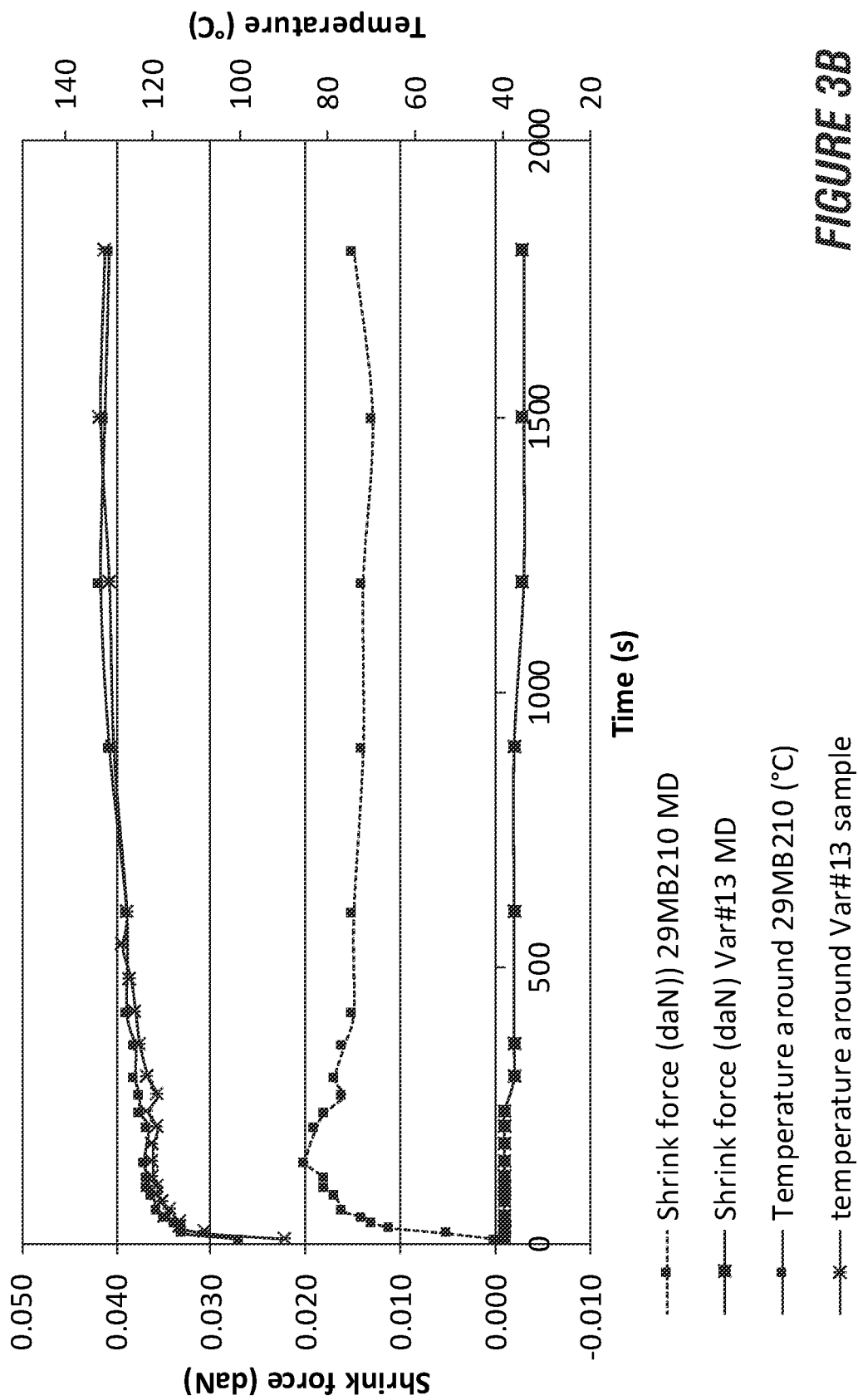

FIGURE 4A

| Rep 2 | | Time(s) | Force(daN) | Shrinking ratio(%) | Temperature around sample (°C) |
|---|---|---|---|---|---|
| var#2.13 | MD | 10.00 | -0.003 | 0 | 118 |
| | | 20.00 | -0.002 | 0 | 119 |
| | | 34.00 | -0.002 | 0 | 120 |
| | | 41.00 | -0.002 | 0 | 121 |
| | | 50.00 | -0.002 | 0 | 122 |
| | | 75.00 | -0.002 | -0.4 | 123 |
| | | 90.00 | 0 | -0.3 | 124 |
| | | 105.00 | 0 | -0.4 | 125 |
| | | 120.00 | 0 | -0.4 | 124 |
| | | 150.00 | 0 | -0.4 | 125 |
| | | 180.00 | 0 | -0.4 | 125 |
| | | 210.00 | -0.001 | -0.4 | 126 |
| | | 240.00 | -0.001 | -0.4 | 18 |
| | | 300.00 | -0.001 | -0.4 | 126 |
| | | 360.00 | -0.001 | -0.4 | 129 |
| | | 600.00 | -0.001 | -0.4 | 130 |
| | | 900.00 | -0.003 | -0.4 | 130 |
| | | 1200.00 | -0.003 | -0.4 | 132 |
| | | 1500.00 | -0.003 | -0.4 | 131 |
| | | 1800.00 | -0.003 | -0.4 | 131 |
| | Cooling | 1801 | 0 | -0.4 | 123 |
| | | | 0 | -0.4 | 115 |
| | | | 0 | -0.4 | 108 |
| | | | 0.003 | 0.1 | 98 |
| | | | 0.009 | 0.3 | 89 |
| | | | 0.029 | 0.4 | 78 |
| | | | 0.046 | 0.5 | 69 |
| | | | 0.07 | 0.7 | 57 |
| | | | 0.083 | 0.8 | 47 |
| | | | 0.084 | 0.8 | 43 |
| | | | 0.09 | 0.8 | 40 |
| | | | 0.097 | 0.9 | 35 |
| | | | 0.101 | 0.9 | 30 |
| | | | 0.104 | 0.9 | 27 |
| | | | 0.098 | 0.9 | 0.25 |
| | | | 0.101 | 0.9 | 24 |
| | | 1827 | 0.101 | 0.9 | 23 |

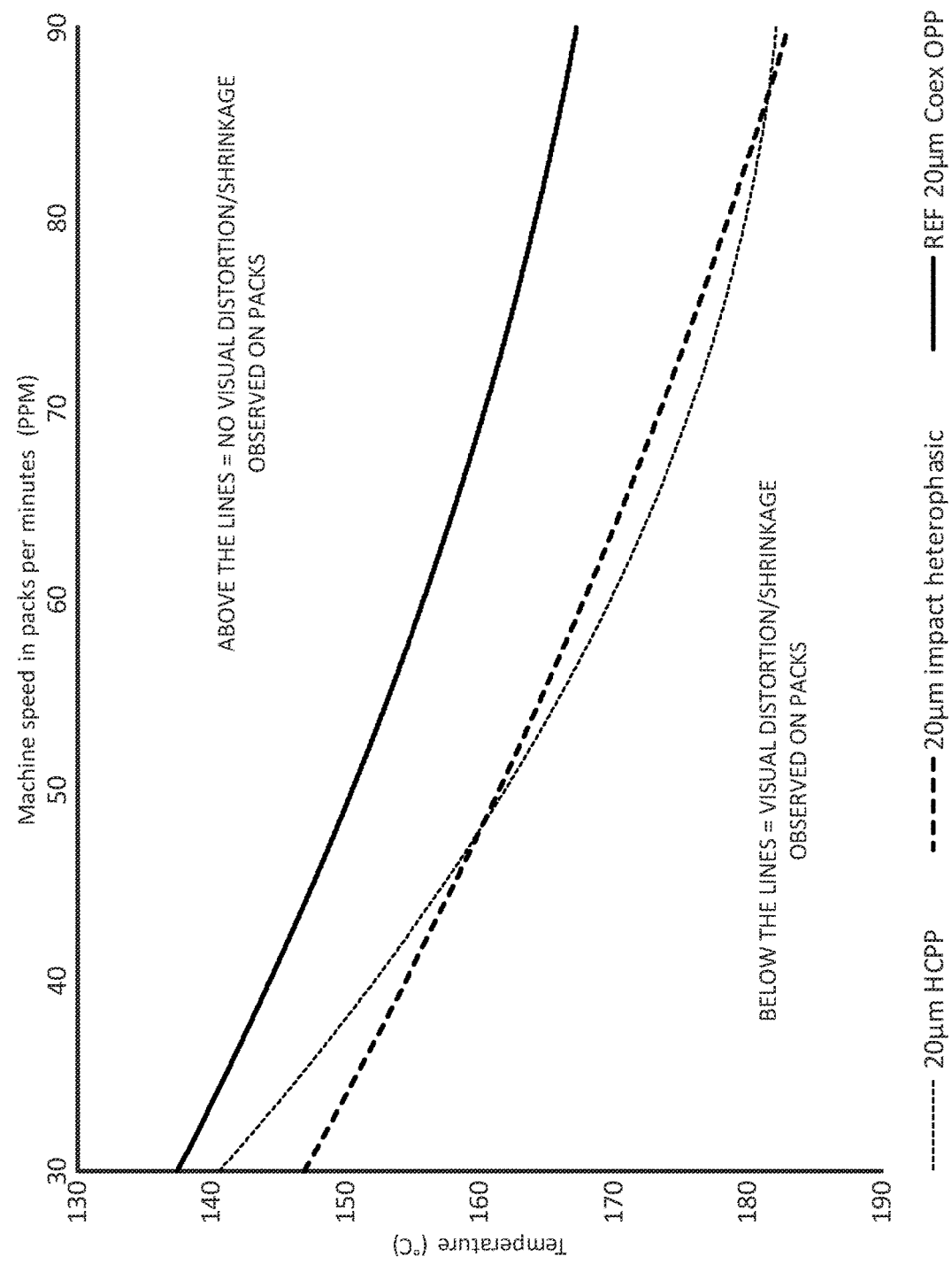

FIGURE 5B

| Speed | 20 μm HCPP | 20 μm Impact Heterophasic | REF 20 μm Coex OPP |
|---|---|---|---|
| 30 | 140 | 140 | 130 |
| 35 | 140 | 140 | 130 |
| 40 | 140 | 145 | 130 |
| 45 | 145 | 145 | 130 |
| 50 | 145 | 145 | 135 |
| 55 | 145 | 150 | 135 |
| 60 | 150 | 155 | 145 |
| 65 | 155 | 160 | 150 |
| 70 | 165 | 165 | 155 |
| 80 | 170 | 170 | 160 |
| 90 | 170 | 170 | 160 |
| 90 | 180 | 180 | 165 |
| 80 | 180 | 180 | 165 |
| 70 | 180 | 180 | 165 |
| 65 | 175 | 170 | 160 |
| 60 | 170 | 170 | 155 |
| 55 | 165 | 160 | 150 |
| 50 | 160 | 160 | 150 |
| 45 | 155 | 155 | 145 |
| 40 | 150 | 155 | 145 |
| 35 | 145 | 150 | 140 |
| 30 | 145 | 150 | 140 |
| 30 | 140 | 140 | 130 |

FIGURE 5C

| Operability window widening VS standard coex OPP at high and low speed (in °C) | | |
|---|---|---|
| | 20μm HCPP | 20μm Impact Heterophasic |
| high speed | +15°C | +15°C |
| low speed | +5°C | +10°C |

FIGURE 5D

| Jaw sticking behavior | | |
|---|---|---|
| 20 μm HCPP | 20 μm Impact Heterophasic | REF 20 μm Coex OPP |
| starts to stick to the jaws >170°C | no jaw sticking observed until 180°C then above it starts to melt | starts to stick to the jaws >160-170°C |

HEAT-STABLE, BIAXIALLY ORIENTED, POLYPROPYLENE FILMS

REFERENCE TO RELATED APPLICATIONS

This is a continuation application, which claims priority to Patent Treaty Cooperation application number PCT/US20/42002 filed on Jul. 14, 2020 that claims priority to each of U.S. provisional patent application Ser. No. 62/875,022 filed on Jul. 17, 2019, which are hereby incorporated by this reference in their entireties and owned by Applicant.

BACKGROUND

Polypropylene resins have been used in applications, such as food packaging, for a long time mainly due to some advantages, such as the relative low density at around 0.91 $g/cm^3$, desirable mechanical properties, excellent chemical resistance versus paper, low viscosity in the molding process, and relatively high melting temperatures at around 165° C.

In food-packaging applications, these advantages have led to an acceptance of polypropylene resins being used, but areas of improvement still remain, especially for applications which require both heat- and impact-resistance, e.g., hot-filling, pasteurizing (e.g., 60° C. for several min.) and retorting/sterilizing (e.g., 120 to 134° C. for 20 to 60 min.).

On the one hand, other materials, such as polyethylene terephthalate ("PET") may be used in laminates, such as for packaging applications and especially as outer film.

In order to extend the performance of polypropylene, additives such as nucleating agents, may be used to enhance specific material properties. Furthermore, the nature of the polypropylene resin is also a consideration for desirable mechanical properties because high-crystalline polypropylene homopolymer improves a film's high-temperature stiffness. Another consideration for desirable mechanical properties may be use of impact heterophasic polymers, which include a homopolymer phase and an elastic phase. Nonetheless, an objective of this disclosure is to improve heat- and/or impact-resistance, whereby, as later disclosed, parameters such as heat-deflection temperature ("HDT") may be used to quantify these properties.

SUMMARY

In one example embodiment, disclosed is a biaxially oriented multilayer film, which may include a first tie layer and a second tie layer, where each has an inside surface and an outside surface. Further, the biaxially oriented multilayer film may include a core layer consisting of: (i) at least 50 wt. % high-crystalline polypropylene; (ii) both cyclic olefin copolymer and polypropylene homopolymer, or, polypropylene heterophasic copolymer; (iii) and, optionally, additives, wherein the core layer is between the inside surface of the first tie layer and the inside surface of the second tie layer. Further still, the biaxially oriented multilayer film may include a first skin layer on the outside surface of the first tie layer and a second skin layer on the outside surface of the second tie layer. And, the biaxially oriented multilayer film has shrinkage of less than 3.5% in a transverse direction for the biaxially oriented multilayer film after subjecting the biaxially oriented multilayer film to 135° C. for 7 min at 1 atm.

BRIEF DESCRIPTION OF THE DRAWINGS

So that the manner in which the above recited features, advantages and objects of the present disclosure are attained and can be understood in detail, a more particular description of this disclosure, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for this disclosure may admit to other equally effective embodiments.

FIG. 3A depicts MD-shrinking data of multilayered films in accordance with this disclosure.

FIG. 3B depicts a MD-shrinking graph of multilayered films in accordance with this disclosure.

FIG. 4A depicts MD-shrinking data of multilayered films in accordance with this disclosure.

FIG. 5A depicts distortion/shrinkage observations and data as a function of machine speed in packs per minute versus temperature of multilayered films in accordance with this disclosure.

FIG. 5B depicts data for plotting and better understanding of FIG. 5A of multilayered films in accordance with this disclosure.

FIG. 5C depicts data for plotting and better understanding of FIG. 5A of multilayered films in accordance with this disclosure.

FIG. 5D depicts data for plotting and better understanding of FIG. 5A of multilayered films in accordance with this disclosure.

DETAILED DESCRIPTION

Figure 1A:
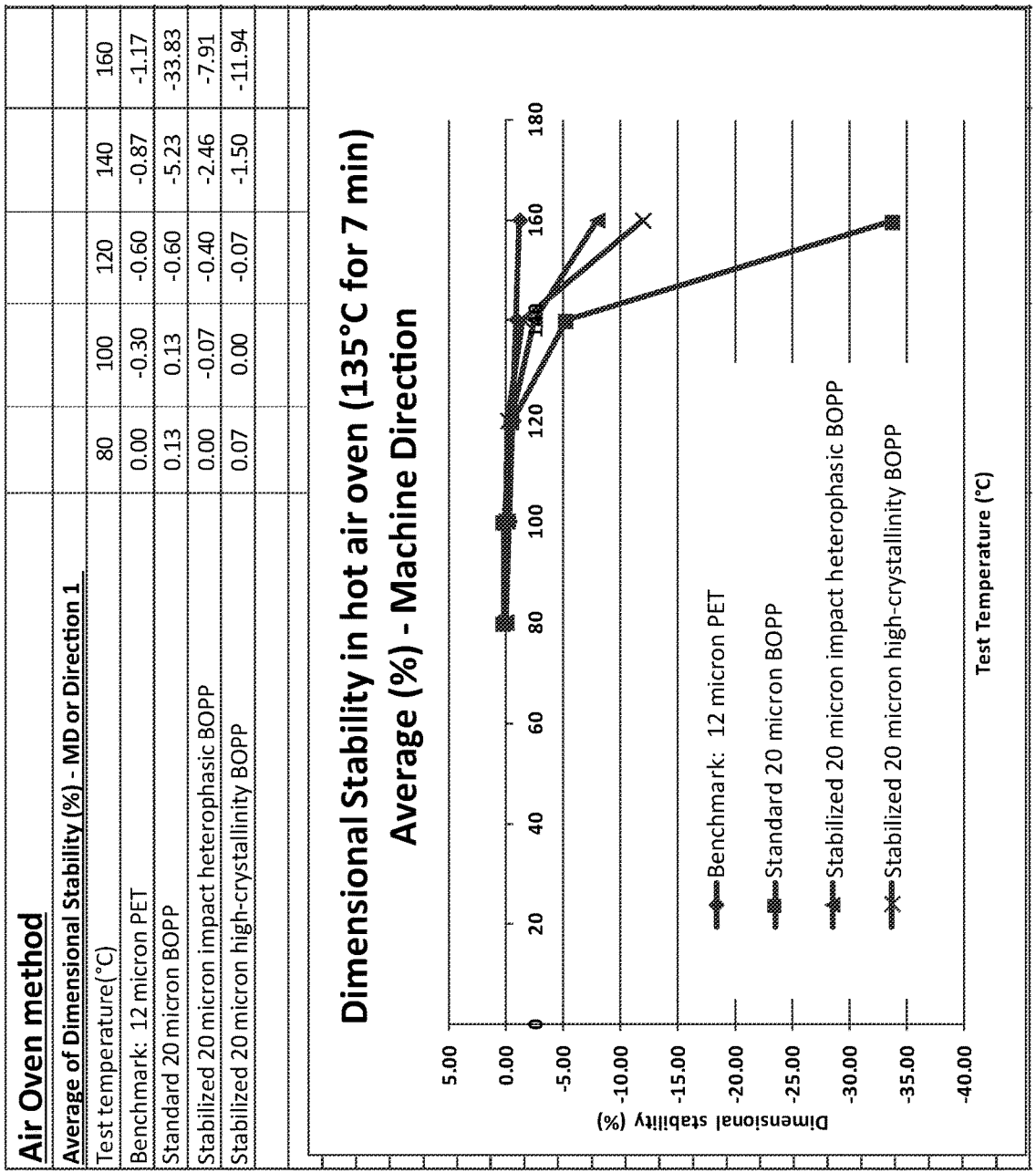
FIG. 1A depicts MD-dimensional stability data and graph of multilayered films in accordance with this disclosure.

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are described now, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

Generally, disclosed are oriented (i.e., monoaxially and/or biaxially), multilayer, polypropylene ("PP") films. In the case of oriented PP films, process may have a significant impact on the mechanical properties of the film. Process parameters may include orientation (i.e., stretching) ratios in the machine direction ("MD") and/or traverse direction as well as process parameter is annealing temperature, which may permit release of internal mechanical stresses generated during orientation.

In the experimental section, disclosed are biaxially oriented polypropylene films, which vary the nature of the resin, film thickness, orientation process, annealing temperatures in order to determine combinations that result in biaxially oriented polypropylene films having properties, such as heat stability, that may be desirable in the marketplace.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film, wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 g/cm$^3$ to 0.920 g/cm$^3$ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

By "consist essentially of," what is meant, for example, is that a particular film layer does not have any more than 1 wt % or 2 wt % or 3 wt % or 4 wt % or 5 wt % of other polymers in the bulk material constituting the film layer's composition, but "consist essentially of" does not exclude the possibility that the particular film layer also has additives, such as anti-slip agents, anti-blocking agents, anti-oxidants, pigments, whitening agents, cavitation agents, etc. regardless of what polymers or other materials make up the additive(s).

Core Layer

As is known to those skilled in the art, the core layer of a multilayered film is most commonly the thickest layer and provides the foundation of the multilayered structure. In some embodiments, the core layer comprises, consists essentially of, or consists of biaxially oriented polypropylene ("BOPP"). In alternative embodiments, the core layer may also include other polymers, including, for instance, biaxially oriented polyethylene ("BOPE"), biaxially oriented polyester ("BOPET"), biaxially oriented polylactic acid ("BOPLA"), and combinations thereof. In still alternate embodiments the core layer may also contain lesser amounts of additional polymer(s) selected from the group consisting of ethylene polymer, ethylene-propylene copolymers, ethylene-propylene-butene terpolymers, elastomers, plastomers, different types of metallocene-LLDPEs (m-LLDPEs), and combinations thereof.

The core layer may further include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60° C. to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

The amount of such hydrocarbon resins, either alone or in combination, in the core layer is preferably less than 20 wt %, more preferably in the range of from 1 wt % to 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 10 wt %, based on the total weight of the core layer.

Preferably, the total amount of additives in the core layer comprises up to about 20 wt. % of the core layer, but some embodiments may comprise additives in the core layer in an amount up to about 30 wt % of the core layer.

The core layer preferably has a thickness in the range of from about 5 µm to 100 µm, more preferably from about 5 µm to 50 µm, most preferably from 5 µm to 25 µm.

Optional Tie Layer(s)

Tie layer(s) of a multilayered film is typically used to connect two other layers of the multilayered film structure, e.g., a core layer and a sealant layer, and is positioned intermediate these other layers. In various embodiments, the films may have zero, one or two tie layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers, maleic-anhydride-modified polyethylene polymers, $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, ethyl-methyl acrylate (EMA) polymers, ethylene-vinyl acetate (EVA) polymers, polar copolymers, and combinations thereof. For example, one polymer may be a grade of VISTAMAXX™ polymer (commercially available from ExxonMobil Chemical Company of Baytown, Tex.), such as VM6100 and VM3000 grades. Alternatively, suitable polymers may include VERSIFY™ polymer (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers, such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 polyethylene plastomers, EMCC 3022.32 low density polyethylene (LDPE) (commercially available from ExxonMobil Chemical Company of Baytown, Tex.).

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, or any of those not mentioned here that are disclosed elsewhere in this application.

The thickness of the tie layer is typically in the range of from about 0.50 to 25 µm, preferably from about 0.50 µm to 12 µm, more preferably from about 0.50 µm to 6 µm, and most preferably from about 2.5 µm to 5 µm. However, in some thinner films, the tie layer thickness may be from about 0.5 µm to 4 µm, or from about 0.5 µm to 2 µm, or from about 0.5 µm to 1.5 µm.

Skin Layer(s), Including Metallizable Skin Layers and Printable Layers

In some embodiments, the skin layer comprises at least one polymer selected from the group comprising, consisting essentially of, and/or consisting of polyethylene copolymers or terpolymers, which may be grafted or copolymerized. In some embodiments, the polyethylene(s) may comprise an acid-containing portion, which may be acrylic-acid based, methacrylic-acid based, another organic acid, or combinations thereof. The acid-containing portion of the acid-containing polymer may be from 4 wt % through 20 wt %, or 6 wt % through 16 wt %, or 8 wt % through 12 wt %. As examples, Exxon Mobil Escor EAA resins or Dupont Nucrel EAA resins or Dow Primacor EAA resins might be used. For metallizing and/or barrier layer(s), the acid-modified skin layer may contain LLDPE or ethylene vinyl alcohol-based polymer(s) ("EVOH"), a suitable EVOH copolymer is EVAL™ G176B or XEP 1300 (commercially available from Kuraray Company Ltd. of Japan).

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.20 µm through 3.5 µm, or from 0.30 µm through 2 µm, or in many embodiments, from 0.50 µm through 1.0 µm. In thin film embodiments, the skin layer thickness may range from about 0.20 µm through 1.5 µm, or 0.50 µm through 1.0 µm.

Additives

Additives present in the film's layer(s) may include, but are not limited to opacifying agents, pigments, colorants, cavitating agents, slip agents, antioxidants, anti-fog agents, anti-static agents, anti-block agents, fillers, moisture barrier additives, gas barrier additives, gas scavengers, and combinations thereof. Such additives may be used in effective amounts, which vary depending upon the property required.

Examples of suitable opacifying agents, pigments or colorants are iron oxide, carbon black, aluminum, titanium dioxide ($TiO_2$), calcium carbonate ($CaCO_3$), and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 µm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is erucamide.

Non-migratory slip agents, used in one or more skin layers of the multilayered films, may include polymethyl methacrylate (PMMA). The non-migratory slip agent may have a mean particle size in the range of from about 0.5 µm to 8 µm, or 1 µm to 5 µm, or 2 µm to 4 µm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable antioxidants may include phenolic antioxidants, such as IRGANOX® 1010 (commercially available from Ciba-Geigy Company of Switzerland). Such an antioxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Optionally, nonionic or anionic wax emulsions can be included in the coating(s), i.e., skin layer(s), to improve blocking resistance and/or lower the coefficient of friction. For example, an emulsion of Michem Lube 215, Michem Lube 160 may be included in the skin layer(s). Any conventional wax, such as, but not limited to Carnauba™ wax (commercially available from Michelman Corporation of Cincinnati, Ohio) that is useful in thermoplastic films is contemplated.

Metallization

The outer surface (i.e., side facing away from the core) of a skin layer and/or laminating substrate may undergo metallization after optionally being treated. Metallization may be carried out through conventional methods, such as vacuum metallization by deposition of a metal layer such as aluminum, copper, silver, chromium, or mixtures thereof. Following metallization, a coating may be applied to the outer metallized layer "outside" or "inside" the vacuum chamber to result in the following structure: metallized layer/skin layer/optional tie layer/core/optional tie layer/skin layer/metallized layer. In an additional embodiment, a primer may be applied on the metal surface(s) followed by top coating(s).

In certain embodiments, the metal for metallization is metal oxide, any other inorganic materials, or organically modified inorganic materials, which are capable of being vacuum deposited, electroplated or sputtered, such as, for example, $SiO_x$, $AlO_x$, $SnO_x$, $ZnO_x$, $IrO_x$, wherein x=1 or 2, organically modified ceramics "ormocer", etc. The thickness of the deposited layer(s) is typically in the range from 100 to 5,000 Angstrom or preferably from 300 to 3000 Angstrom.

Surface Treatment

One or both of the outer surfaces of the multilayered films may be surface-treated to increase the surface energy to render the film receptive to metallization, coatings, printing inks, adhesives, and/or lamination. The surface treatment can be carried out according to one of the methods known in the art including corona discharge, flame, plasma, chemical treatment, or treatment by means of a polarized flame.

Priming

An intermediate primer coating may be applied to multilayered films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy, poly(ethylene imine) (PEI), and polyurethane materials. U.S. Pat. Nos. 3,753,769, 4,058,645 and 4,439,493, each incorporated herein by reference, discloses the use and application of such primers. The primer provides an overall adhesively active surface for thorough and secure bonding with the subsequently applied coating composition and can be applied to the film by conventional solution coating means, for example, by roller application.

Orienting

The films herein are also characterized in certain embodiments as being biaxially oriented. The films can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the tentered method. In the tentered process, line speeds of greater than 100 m/min to 400 m/min or more, and outputs of greater than 2000 kg/h to 4000 kg/h or more are achievable. In the tenter process, sheets/films of the various materials are melt-blended and coextruded, such as through a 3, 4, 5, 7-layer die head, into the desired film structure. Extruders ranging in diameters from 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, but high enough to facilitate the machine direction orientation process. Such temperatures referred to herein refer to the film temperature itself. The film temperature can be measured by using, for example, infrared spectroscopy, the source aimed at the film as it is being processed; those skilled in the art will understand that for transparent films, measuring the actual film temperature will not be as precise. The heating means for the film line may be set at any appropriate level of heating, depending upon the instrument, to achieve the stated film temperatures.

The lengthened and thinned film is passed to the tenter section of the line for TD orientation. At this point, the edges of the sheet are grasped by mechanical clips on continuous chains and pulled into a long, precisely controlled hot air oven for a pre-heating step. The film temperatures range from 100 or 110 to 150 or 170 or 180° C. in the pre-heating step. Again, the temperature will be below that which will melt the film, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the process temperature is lowered by at least 2° C. but typically no more than 20° C. relative to the pre-heat temperature to maintain the film temperature so that it will not melt the film. After stretching to achieve transverse orientation in the film, the film is annealed at a temperature below the melting point, and the film is then cooled from 5 to 10 or 15 or 20 or 30 or 40° C. below the stretching temperature, and the clips are released prior to edge trim, optional coronal, printing and/or other treatment can then take place, followed by winding.

Thus, TD orientation is achieved by the steps of pre-heating the film having been machine oriented, followed by stretching and annealing it at a temperature below the melt point of the film, and then followed by a cooling step at yet a lower temperature. In one embodiment, the films described herein are formed by imparting a transverse orientation by a process of first pre-heating the film, followed by a decrease in the temperature of the process within the range of from 2 or 3 to 5 to 10 or 15 or 20° C. relative to the pre-heating temperature while performing transverse orientation of the film, followed by a lowering of the temperature within the range of from 5° C. to 10 or 15 or 20 or 30 or 40° C. relative to the melt point temperature, holding or slightly decreasing (more than 5%) the amount of stretch, to allow the film to anneal. The latter step imparts the low TD shrink characteristics of the films described herein. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

Thus, in certain embodiments the film(s) described herein are biaxially oriented with at least a 5 or 6 or 7 or 8-fold TD orientation and at least a 2 or 3 or 4-fold MD orientation. Being so formed, the at least three-layer (one core, two skin layers, 18-21 μm thickness) possess an ultimate tensile strength within the range of from 100 or 110 to 80 or 90 or 200 MPa in the TD in certain embodiments; and possess an ultimate tensile strength within the range of from 30 or 40 to 150 or 130 MPa in the MD in other embodiments. Further, the SCS films described herein possess an MD Elmendorf tear is greater than 10 or 15 g in certain embodiments, and the 25 TD Elmendorf tear is greater than 15 or 20 g in other embodiments.

Variations in orientation ratios and temperatures are reported in the experimental and example embodiment section herein.

INDUSTRIAL APPLICABILITY

The disclosed multilayered films may be stand-alone films, laminated to substrates, or webs. Or, the multilayered films may be sealed, coated, metallized, and/or laminated to other film structures. The laminating substrate, itself, may for instance, be a BOPE or a non-oriented, cast or blown PE film with or without the assistance of adhesive(s), increases in temperature and/or pressure, water or solvents, etc.; furthermore, the laminating substrate may or may not be metallized and/or coated. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications, it may be desirable to laminate the multilayered films to other polymeric film or paper products for purposes such as package decor including printing and metallizing. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

EXPERIMENTAL SECTION—EXAMPLE EMBODIMENTS

The specific nature of the polypropylene resin may improve the dimensional stability of the biaxially oriented polypropylene ("BOPP") film when the BOPP film is placed in an air oven and/or is sealed. Evaluating the specific nature, attention turns to the use of impact heterophasic copolymers and high-crystallinity polypropylene. Impact heterophasic copolymers are thermoplastic resins that may be produced through the polymerization of propylene and ethylene by using, for example, ZN catalysts. Their synthesis has a heterophasic amorphous structure, i.e., a polymer matrix that may comprise an ethylene-propylene copolymer inside a semi-crystalline polypropylene homopolymer. Although semi-crystalline polypropylene has crystallinity in the range of 10 to 80% crystallinity, high-crystallinity polypropylene, such as from highly isotactic polypropylene, has a crystallinity greater than 80% or even 90%. High-crystallinity-grade polypropylene is mainly obtained with Ziegler-Natta ("ZN") polymerization using metallocene catalyst(s).

High Heat-Deflection-Temperature ("HDT") polypropylene resins are those that provide sealing typically about 130° C. Inclusion of cyclic olefin copolymers ("COCs") typically improve the stiffness and heat resistance, but too much COC may lead to brittleness.

Table 1 shows heat resistance of different resins based on differential scanning calorimetry measurements, wherein the difference between PP homopolymer 1 and PP homopolymer 2 is linked to degree of isotacticity and molecular weight, i.e., average plus distribution.

TABLE 1

| | Melting | | | | Crystallization | | | |
|---|---|---|---|---|---|---|---|---|
| resin grade | enthalpy (J/g) | peak (° C.) | onset (° C.) | end (° C.) | enthalpy (J/g) | peak (° C.) | onset (° C.) | end (° C.) |
| PP impact heterophasic | 82.8 | 168.4 | 153.5 | 176.3 | 91.2 | 128.1 | 120.5 | 133.4 |
| high-crystallinity PP | 92.1 | 168.8 | 152 | 175 | 105 | 110.7 | 103.7 | 116.7 |
| PP homopolymer 1 | 88.1 | 167.2 | 150.7 | 175 | 97.5 | 116.5 | 109 | 120.7 |
| PP homopolymer 2 | 85.5 | 168.4 | 151.9 | 173.6 | 93 | 116.7 | 107.3 | 121.1 |

TABLE 1-continued

| resin grade | Melting | | | | Crystallization | | | |
|---|---|---|---|---|---|---|---|---|
| | enthalpy (J/g) | peak (° C.) | onset (° C.) | end (° C.) | enthalpy (J/g) | peak (° C.) | onset (° C.) | end (° C.) |
| HDT PP homopolymer from Dow | 97.2 | 171.4 | 155.5 | 177.1 | 105.9 | 131.4 | 124.1 | 136.6 |

Turning now to film thickness, measurements of a coextruded BOPP film having layers containing PP in the form of homopolymers and/or ethylene-propylene copolymer(s) and/or ethylene-propylene-butylene terpolymer(s) shows that dimensional stability increases as thickness of the film increases, and especially so in the transverse direction. To wit, below is Table 2.

TABLE 2

| Film Thickness (µm) | MD Dimensional Stability @ 135° C./7 min at 1 atm (Shrink %) | TD Dimensional Stability @ 135° C./7 min at 1 atm (Shrink %) |
|---|---|---|
| 8 | 3.0 | 1.0 |
| 12 | 3.0 | 1.0 |
| 19 | 4.1 | 3.4 |
| 23 | 4.4 | 2.8 |
| 30 | 3.9 | 2.5 |
| 39 | 3.6 | 1.9 |
| 50 | 3.6 | 2.1 |
| 57 | 3.5 | 2.3 |
| 70 | 3.4 | 1.8 |
| 75 | 3.3 | 1.4 |

Orientation also affects a BOPP film's properties as shown in Table 3. For this table, the BOPP film was 22 µm thick and had an A/B/C/B/A structure with the following compositions: 15.4 µm core layer consisting of 50 wt. % high-crystalline PP, 40 wt. % PP homopolymer and 10% COCs; and 0.8 µm skin layers consisting of EPB terpolymer. In other embodiments, the BOPP film may have different thicknesses, e.g., from about 20 µm through about 100 µm by non-limited examples, and compositional variations may occur that do not depart from Table 3, which shows that shrinkage in MD and TD is less than in standard BOPP films, which is normally on the level of at least 5%, and usually on the order of 7-10% or more, in each direction under the same conditions, i.e., 135° C./7 min at 1 atm. For instance, the compositional variations may include the BOPP film's core layer having polymers comprising, consisting essentially of, or consisting of: (i) at least 50 wt. % high-crystalline PP (e.g., 60 wt. %, 70 wt. %, 80 wt. %, 90 wt. %, 95 wt. %, 100 wt. %, and any range between 50 wt. % and 100 wt. % without being pedantic and writing down each sub-range within the from 50 wt. %-100 wt. % range); (ii) either (a) ≤40 wt. % PP homopolymer is present and from about 2 wt. % through about 10 wt. % of COCs (and more preferably, about 5 wt. % and/or about 10 wt. %) is present, or (b) 40 wt. % PP heterophasic copolymer(s) (i.e., PP impact copolymer(s)); and (iii) optionally additives. In various embodiments, the foregoing (ii)(a) or (ii)(b) alternative is understood to apply equally for the core's composition as well as each tie layer's composition even if only one of these alternatives is stated in the tables, such as Table 5 herein.

TABLE 3

| MD Orientation Ratio | TD Orientation Ratio | MD Dimensional Stability @ 135° C./ 7 min at 1 atm (Shrink %) | TD Dimensional Stability @ 135° C./ 7 min at 1 atm (Shrink %) |
|---|---|---|---|
| 4.0 | 8.0 | 3.1 | 2.5 |
| 4.5 | 8.0 | 3.7 | 3.8 |
| 5.0 | 8.0 | 4.0 | 5.5 |

Yet another parameter affecting properties of BOPP films is annealing temperature, which allows the film to relax after orientation; that is, the annealing temperature is a subsequent process to the orienting temperature. The higher the annealing temperature is, then the higher the relaxation of the mechanical constraints generated and stored in the material during the two orientation steps. The annealing temperature, for instance, can be increased to 130° C. from a standard 120° C. in MD direction and to 170° C. from a standard 160-165° C. in TD direction for a BOPP film. This annealing temperature increase is because the disclosed BOPP films are more stable than incumbent BOPP films. Moreover, the TDO rail spacing is adjusted accordingly with a higher than usual "toe-in" that can reach 12 to 18% versus a standard 4 to 8%.

In Table 4, dimensional stabilities measured with a Hirrlinger graduated bar are reported for a BOPP film.

TABLE 4

| PP Resin | Thickness (µm) | Biaxially Oriented Process (MDO/TDO) | MD Dimensional Stability @ 135° C./ 7 min at 1 atm (Shrink %) | TD Dimensional Stability @ 135° C./ 7 min at 1 atm (Shrink %) |
|---|---|---|---|---|
| homopolymer + copolymer + terpolymer + high-crystallinity PP | 15 | standard* | 6.1 | 4.4 |
| homopolymer + copolymer + terpolymer | 18 | standard* | 4.6 | 4.3 |
| homopolymer | 19 | standard* | 4.1 | 3.3 |
| variable #1 | 22 | heat-stable optimized** | 3.2 | 1.7 |
| variable #2 | 22 | heat-stable optimized** | 3.1 | 2.3 |
| variable #3 | 22 | heat-stable optimized** | 3.4 | 2.5 |
| variable #4 | 22 | heat-stable optimized** | 2.8 | 1.3 |
| variable #5 | 22 | heat-stable optimized** | 1.1 | 2.3 |
| variable #6 | 22 | heat-stable optimized** | 2.8 | 1.5 |
| variable #7 | 22 | heat-stable optimized** | 2.4 | 2.5 |
| variable #8 | 22 | heat-stable optimized** | 2.7 | 0.8 |

TABLE 4-continued

| PP Resin | Thickness (μm) | Biaxially Oriented Process (MDO/TDO) | MD Dimensional Stability @ 135° C./ 7 min at 1 atm (Shrink %) | TD Dimensional Stability @ 135° C./ 7 min at 1 atm (Shrink %) |
| --- | --- | --- | --- | --- |
| variable #9 | 22 | heat-stable optimized** | 3.3 | 2.3 |
| variable #10 | 22 | heat-stable optimized** | 3.3 | 2.0 |
| variable #11 | 22 | heat-stable optimized** | 3.2 | 2.2 |
| variable #12 | 22 | heat-stable optimized** | 3.2 | 2.5 |
| variable #13 | 22 | heat-stable optimized** | 3.3 | 1.7 |

*= MDO: 4.5-5x and TDO: 7.5-8.5x
**= MDO: 4x and TDO: 7.5-8.5x with MD high-annealing temperature at 130° C. and TD high-annealing temperature at 170° C.
Variables #1-13: Each of these BOPP films contain homopolymer PP, ethylene-propylene butylene terpolymer, high-crystallinity PP, cyclic olefin copolymer (COC) and masterbatches with the following designs shown in Table 5

TABLE 5

| Variable # | Skin #1 | Tie #1 | Core | Skin #2 | Tie #2 |
| --- | --- | --- | --- | --- | --- |
| 15-micron standard | EPB terpolymer | PP homopolymer | 50 wt. % PP homopolymer + 50 wt. % high-crystallinity PP | EP Copolymer | — |
| 18-micron Standard | EPB terpolymer | PP homopolymer | PP homopolymer | EP copolymer | — |
| 18-micron standard #2 | PP homopolymer | PP homopolymer | PP homopolymer | PP homopolymer | PP homopolymer |
| 1 | EPB terpolymer | 50 wt. % PP homopolymer + 50 wt. % high-crystallinity PP | 50 wt. % PP homopolymer + 50 wt. % high-crystallinity PP | 50 wt. % PP homopolymer + 50 wt. % high-crystallinity PP | EPB terpolymer |
| 2 | EPB terpolymer | 50 wt. % high-crystallinity PP + 40 wt. % PP homopolymer + 10 wt. % PP masterbatch #1 | 50 wt. % PP homopolymer + 50 wt. % high-crystallinity PP | 50 wt. % high-crystallinity PP + 40 wt. % PP homopolymer + 10 wt. % PP masterbatch #1 | EPB terpolymer |
| 3 | EPB terpolymer | 50 wt. % PP homopolymer + 50 wt. % high-crystallinity PP | 50 wt. % PP homopolymer + 50 wt. % high-crystallinity PP | 50 wt. % PP homopolymer + 50 wt. % high-crystallinity PP | EPB terpolymer |
| 4 | EPB terpolymer | high-crystallinity PP | 50 wt. % PP homopolymer + 50 wt. % high-crystallinity PP | high-crystallinity PP | EPB terpolymer |
| 5 | EPB terpolymer | high-crystallinity PP | high-crystallinity PP | high-crystallinity PP | EPB terpolymer |
| 6 | EPB terpolymer | 60 wt. % PP homopolymer + 40 wt. % COC | 50 wt. % PP homopolymer + 50 wt. % high-crystallinity PP | 60 wt. % PP homopolymer + 40 wt. % COC | EPB terpolymer |
| 7 | EPB terpolymer | 60 wt. % COC + 40 wt. % PP homopolymer | 50 wt. % PP homopolymer + 50 wt. % high-crystallinity PP | 60 wt. % COC + 40 wt. % PP homopolymer | EPB terpolymer |
| 8 | EPB terpolymer | 50 wt. % high-crystallinity PP + 40 wt. % PP homopolymer + 10 wt. % COC | 50 wt. % PP homopolymer + 50 wt. % high-crystallinity PP | 50 wt. % high-crystallinity PP + 40 wt. % PP homopolymer + 10 wt. % COC | EPB terpolymer |
| 9 | EPB terpolymer | 50 wt. % high-crystallinity PP + 40 wt. % PP homopolymer + 10 wt. % masterbatch #2 | 50 wt. % PP homopolymer + 50 wt. % high-crystallinity PP | 50 wt. % high-crystallinity PP + 40 wt. % PP homopolymer + 10 wt. % masterbatch #2 | EPB terpolymer |
| 10 | EPB terpolymer | 50 wt. % high-crystallinity PP + 30 wt. % PP homopolymer + 20 wt. % masterbatch #2 | 50 wt. % PP homopolymer + 50 wt. % high-crystallinity PP | 50 wt. % high-crystallinity PP + 30 wt. % PP homopolymer + 20 wt. % masterbatch #2 | EPB terpolymer |

TABLE 5-continued

| Variable # | Skin #1 | Tie #1 | Core | Skin #2 | Tie #2 |
|---|---|---|---|---|---|
| 11 | EPB terpolymer | 50 wt. % high-crystallinity PP + 40 wt. % PP homopolymer + 10 wt. % masterbatch #3 | 50 wt. % PP homopolymer + 50 wt. % high-crystallinity PP | 50 wt. % high-crystallinity PP + 40 wt. % PP homopolymer + 10 wt. % masterbatch #2 | EPB terpolymer |
| 12 | EPB terpolymer | 50 wt. % high-crystallinity PP + 30 wt. % PP homopolymer + 20 wt. % masterbatch #3 | 50 wt. % PP homopolymer + 50 wt. % high-crystallinity PP | 50 wt. % high-crystallinity PP + 30 wt. % PP homopolymer + 20 wt. % masterbatch #2 | EPB terpolymer |
| 13 | EPB terpolymer | 50 wt. % high-crystallinity PP + 40 wt. % PP homopolymer + 10 wt. % masterbatch #1 | 50 wt. % PP homopolymer + 50 wt. % high-crystallinity PP | 50 wt. % high-crystallinity PP + 40 wt. % PP homopolymer + 10 wt. % masterbatch #2 | EPB terpolymer | wherein, masterbatch #1, #2 and #3 contain COC and additives

Figure 1B:
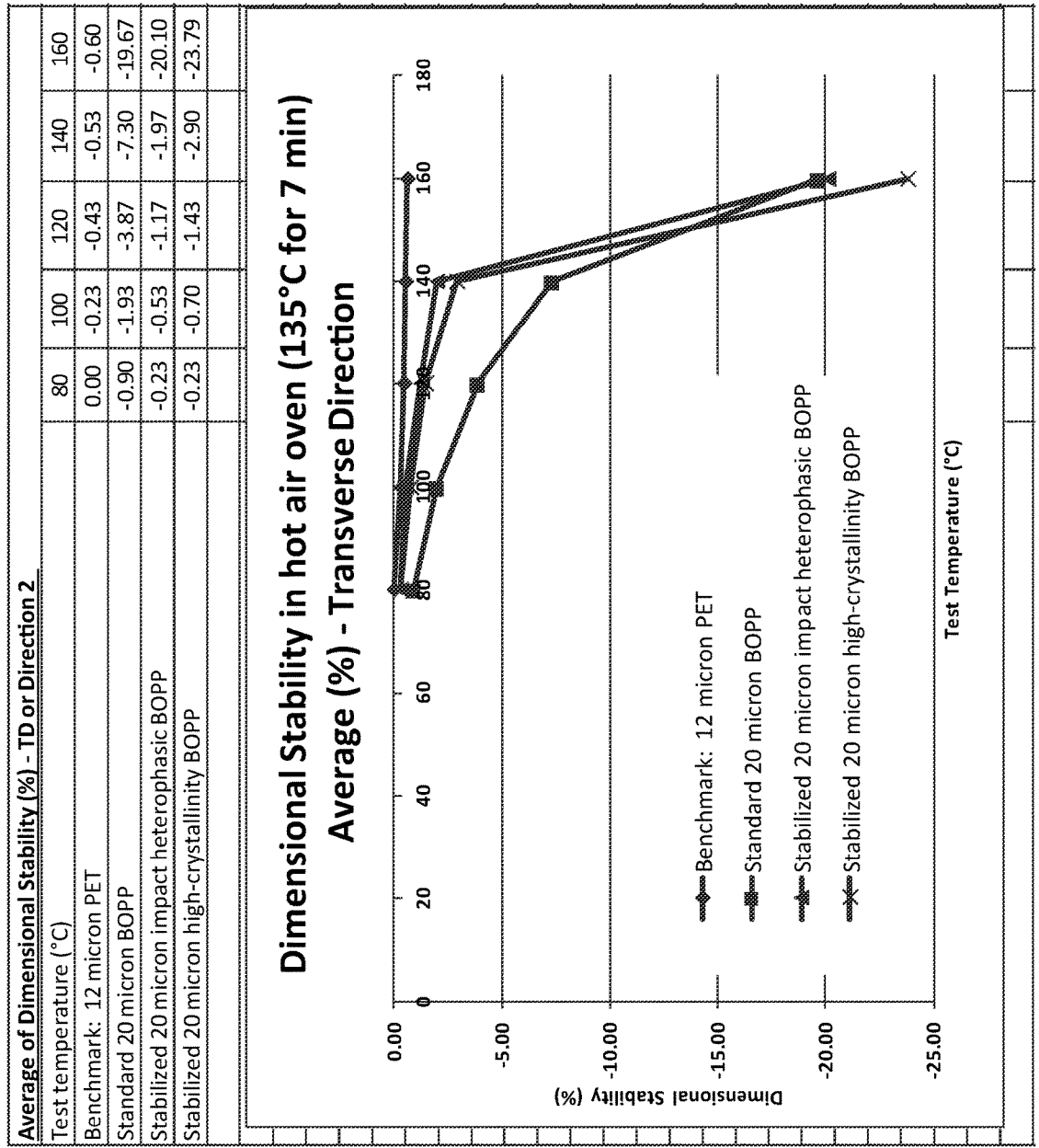
FIG. 1B depicts TD-dimensional stability data and graph of multilayered films in accordance with this disclosure.
Figure 2A:
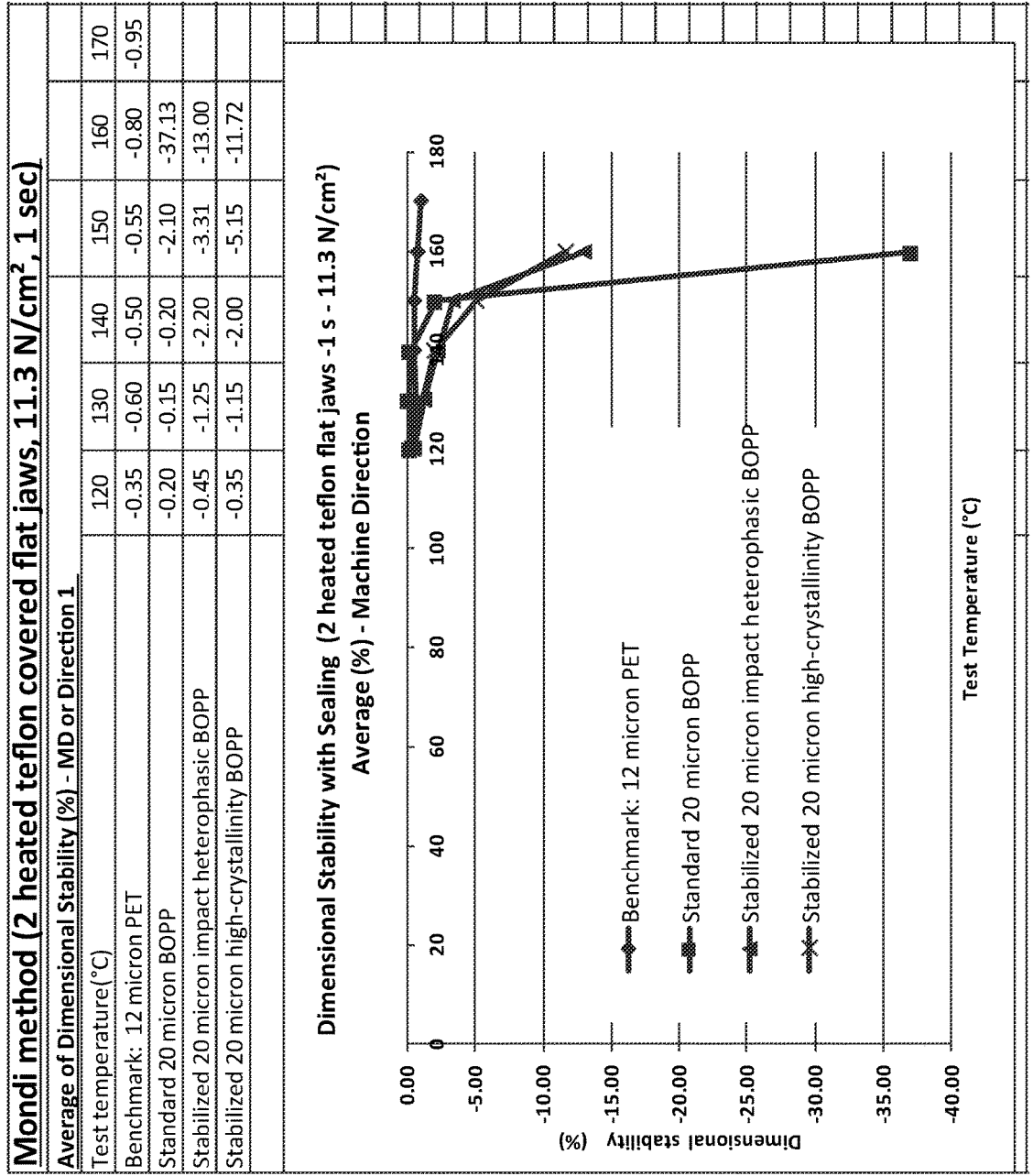
FIG. 2A depicts MD-dimensional stability data and graph of multilayered films in accordance with this disclosure.
Figure 2B:
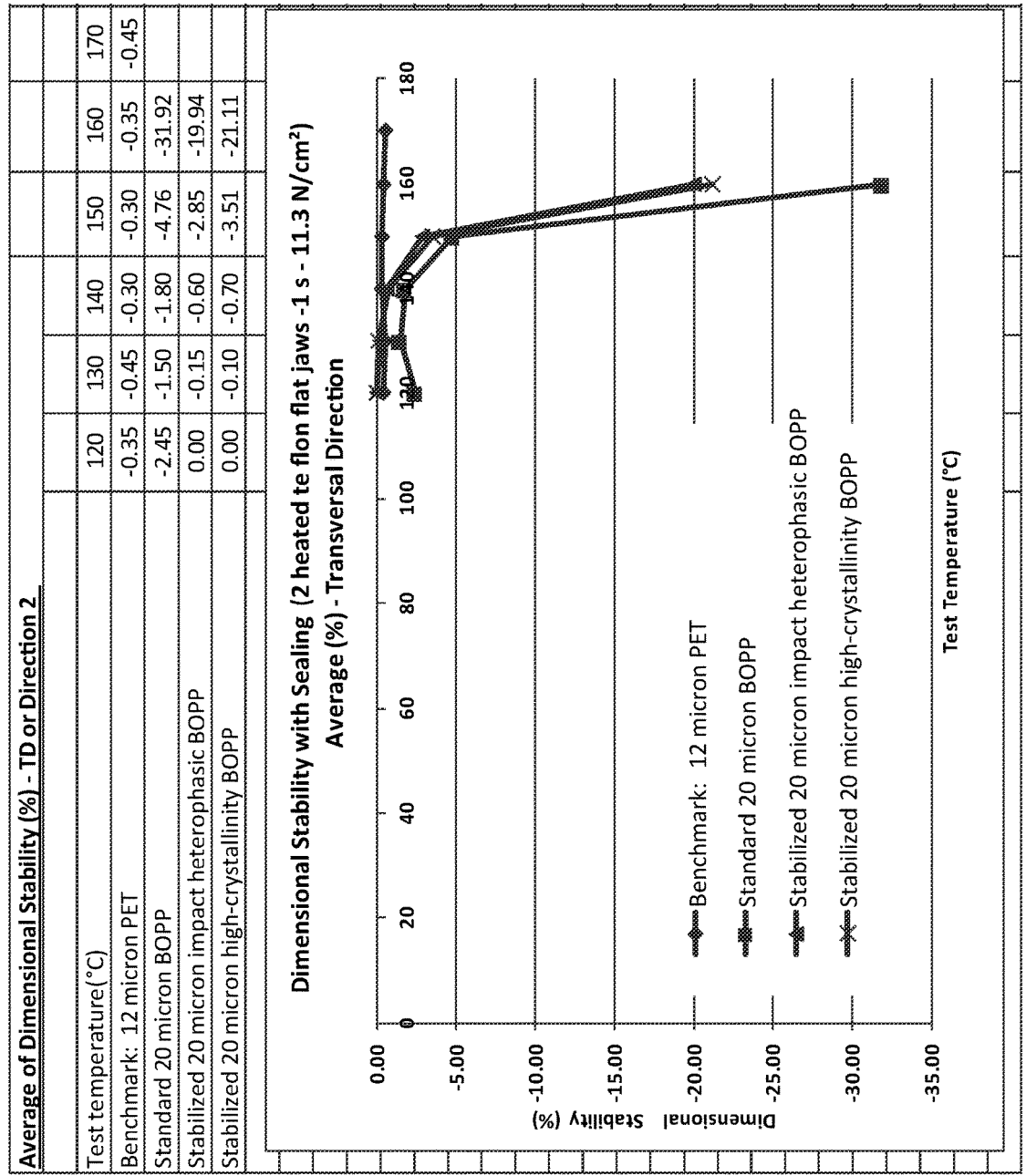
FIG. 2B depicts TD-dimensional stability data and graph of multilayered films in accordance with this disclosure.

Focus now shifts to the drawings. FIGS. 1A and 1B plot dimensional stability (MD and TD, respectively) in a hot-air oven in terms of shrink percentage over a range of temperatures. FIGS. 2A and 2B plot dimensional stability (MD and TD, respectively) using the Mondi method in terms of shrink percentage over a range of temperatures. In these figures, three different 20 μm BOPP films are compared to a benchmark, a 12 μm polyester ("PET") film. Regarding the BOPP films in FIGS. 1A and 1B, standard 20-micron BOPP has the same composition as standard 18-micron in Table 5. Stabilized 20-micron impact heterophasic BOPP contains 100% heterophasic PP resin. Stabilized 20-micron, high-crystallinity BOPP film contains 100% high crystallinity PP resin.

Figure 4B:
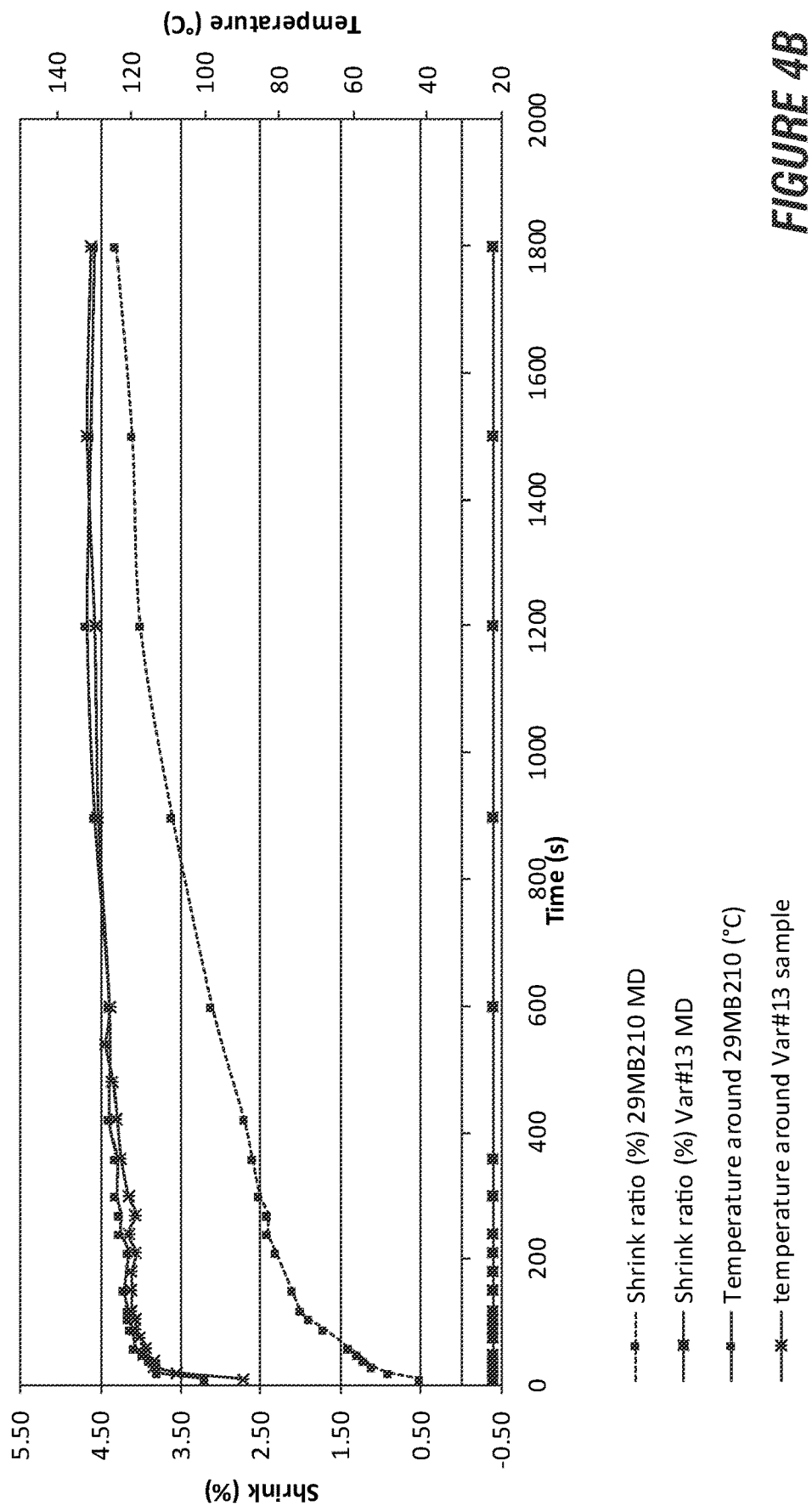
FIG. 4B depicts a MD-shrinking graph of multilayered films in accordance with this disclosure.

Moving on, FIGS. 3A and 4A provide the measurement data for FIGS. 3B and 4B, respectively, which plot shrink force (i.e., in dekanewtons) in the MD direction as a function of time for heated films over a range from ambient temperature (i.e., 23° C.) through 130° C. at a pressure of 1 atm. The films themselves are biaxially stretch with TDX=8.0 and: (1) 29MB210 MDX=4.7 and (2) variable #13 MDX=4.0.

FIGS. 5B-5D provide data for plotting and better understanding of FIG. 5A, which plots machine speed in packs per minute for heated films over a range from about 135° C. through about 180° C. at a pressure of 0.5 atm. As shown in FIG. 5A, the films are biaxially oriented and contain 100% high-crystallinity PP ("HCPP") or 100% PP heterophasic copolymer, e.g., a PP homopolymer matrix with a phase of ethylene/propylene copolymer, as compared to the reference, a 100% PP homopolymer (i.e., "coex OPP"). In other example embodiments and without departing from the results shown in FIG. 5A-5D, these films could have: at least one skin with EP copolymer or EPB terpolymer, which may provide the films with printing properties; and/or at least one skin with slip particles, e.g., silica, PMMA, silicon gum or oil, etc. in order to control the coefficient of friction. Beneficially, both of the films have lower lines for distortion and shrinkage as compared to a standard BOPP films. And with regard to FIG. 5C, this figure summarizes that both films have an improved "operating window" for packs per minute on the packaging machine as compared to a standard BOPP film speed; for clarity, the higher the number, then the better it is to run the film on packaging machine.

Although written in claim form, below are additional example embodiments of the films disclosed in this application.

1. A biaxially oriented multilayer film comprising:
   a first tie layer and a second tie layer, where each has an inside surface and an outside surface;
   a core layer consisting of: (i) at least 50 wt. % high-crystalline polypropylene; (ii) both cyclic olefin copolymer and polypropylene homopolymer, or, polypropylene heterophasic copolymer; (iii) and, optionally, additives, wherein the core layer is between the inside surface of the first tie layer and the inside surface of the second tie layer;
   a first skin layer on the outside surface of the first tie layer and a second skin layer on the outside surface of the second tie layer,
   wherein shrinkage is less than 3.5% in a transverse direction for the biaxially oriented multilayer film after subjecting the biaxially oriented multilayer film to 135° C. for 7 min at 1 atm.

2. The biaxially oriented multilayer film of claim 1, further comprising shrinkage is less than 4.5% in a machine direction for the biaxially oriented multilayer film after subjecting the biaxially oriented multilayer film to 135° C. for 7 min at 1 atm.

3. The biaxially oriented multilayer film of claim 1, wherein the core layer, t first tie layer, the second tie layer, the first skin layer, and the second skin layer are coextruded.

4. The biaxially oriented multilayer film of claim 1, wherein the polypropylene heterophasic copolymer is an ethylene-propylene copolymer inside a semi-crystalline polypropylene homopolymer.

5. The biaxially oriented multilayer film of claim 1, further comprising one or more additives.

6. The biaxially oriented multilayer film of claim 1, wherein the first skin layer, the second skin layer or both comprise ethylene-propylene-butylene.

7. The biaxially oriented multilayer film of claim 1, wherein thickness of the biaxially oriented multilayer film is from about 20 μm through about 100 μm.

8. The biaxially oriented multilayer film of claim 1, wherein the first tie layer, the second tie layer or both comprise polypropylene homopolymer.

9. The biaxially oriented multilayer film of claim 8, wherein the first tie layer, the second tie layer or both further comprise high-crystalline polypropylene.

10. The biaxially oriented multilayer film of claim 1, wherein the first tie layer, the second tie layer or both comprise high-crystalline polypropylene.

11. The biaxially oriented multilayer film of claim 1, wherein the first tie layer, the second tie layer or both comprise at least 50 wt. % polypropylene homopolymer.

12. The biaxially oriented multilayer film of claim 11, wherein the first tie layer, the second tie layer or both further comprise high-crystalline polypropylene.

13. The biaxially oriented multilayer film of claim 1, wherein the first tie layer, the second tie layer or both comprise at least 50 wt. % high-crystalline polypropylene.

14. The biaxially oriented multilayer film of claim 13, wherein the first tie layer, the second tie layer or both further comprise polypropylene homopolymer.

15. The biaxially oriented multilayer film of claim 14, wherein the first tie layer, the second tie layer or both further comprise cyclic olefin copolymer, optionally in a masterbatch solution.

16. The biaxially oriented multilayer film of claim 13, wherein the first tie layer, the second tie layer or both further comprise polypropylene heterophasic copolymer.

17. The biaxially oriented multilayer film of claim 1, wherein polypropylene homopolymer is present at ≤40 wt. % and the cyclic olefin copolymer is present within a range from about 2 wt. % through about 10 wt. %.

18. The biaxially oriented multilayer film of claim 1, further comprising at least one metallization layer on the first skin layer, the second skin layer or both.

19. The biaxially oriented multilayer film of claim 1, further comprising a barrier coating on the first skin layer, the second skin layer or both.

20. The biaxially oriented multilayer film of claim 1, further comprising a printable coating on the first skin layer, the second skin layer or both.

While the foregoing is directed to example embodiments of the disclosed invention, other and further embodiments may be devised without departing from the basic scope thereof, wherein the scope of the disclosed compositions, systems and methods are determined by one or more claims.

What is claimed is:

1. A biaxially oriented multilayer film comprising:
a first tie layer, which has an inside surface and an outside surface, wherein the first tie layer consists of: (i) at least 90 wt. % polypropylene consisting of polypropylene homopolymer, high-crystalline polypropylene or heterophasic copolymer; and (ii) optionally, cyclic olefin copolymer and/or additives; and
a core layer consisting of: (i) either at least 50 wt. % of high-crystalline polypropylene or 100 wt. % heterophasic copolymer; and (ii) optionally, heterophasic copolymer, wherein the core layer is on the inside surface of the first tie layer,
a first skin layer on the outside surface of the first tie layer, wherein the first skin layer has a thickness from 0.30 μm through 2 μm,
wherein shrinkage is less than 3.5% in a transverse direction for the biaxially oriented multilayer film after subjecting the biaxially oriented multilayer film to 135° C. for 7 min at 1 atm.

2. The biaxially oriented multilayer film of claim 1, further comprising shrinkage is less than 4.5% in a machine direction for the biaxially oriented multilayer film after subjecting the biaxially oriented multilayer film to 135° C. for 7 min at 1 atm.

3. The biaxially oriented multilayer film of claim 1, wherein the core layer, the first tie layer, and the first skin layer are coextruded.

4. The biaxially oriented multilayer film of claim 1, wherein the polypropylene heterophasic copolymer is an ethylene-propylene copolymer inside a semi-crystalline polypropylene homopolymer.

5. The biaxially oriented multilayer film of claim 1, wherein the first tie layer consists of the polypropylene homopolymer.

6. The biaxially oriented multilayer film of claim 1, further comprising a second tie layer on a side of the core layer that is opposite of the first tie layer, wherein the second tie layer consists of polypropylene and, optionally, additives.

7. The biaxially oriented multilayer film of claim 1, wherein thickness of the biaxially oriented multilayer film is from about 20 μm through about 100 μm.

8. The biaxially oriented multilayer film of claim 1, further comprising a second skin layer on the core layer or on a second tie layer.

9. The biaxially oriented multilayer film of claim 6, wherein the first tie layer, the second tie layer or both consists of high-crystalline polypropylene.

10. The biaxially oriented multilayer film of claim 8, wherein the first skin layer, the second skin layer or both are flame-treated.

11. The biaxially oriented multilayer film of claim 6, wherein the second skin layer consists of polyethylene, polybutylene, ethylene-polypropylene-butene, or combinations thereof.

12. The biaxially oriented multilayer film of claim 1, wherein the cyclic olefin copolymer is present within a range from about 2 wt. % through about 10 wt. %.

13. The biaxially oriented multilayer film of claim 1, wherein the first tie layer consists of the polypropylene homopolymer and the additives for slip and/or antiblock.

14. The biaxially oriented multilayer film of claim 6, wherein the first tie layer, the second tie layer or both consists of the polypropylene heterophasic copolymer.

15. The biaxially oriented multilayer film of claim 1, wherein the first tie layer consists of polypropylene heterophasic copolymer and one or more additives.

16. The biaxially oriented multilayer film of claim 1, wherein the first tie layer consists of polypropylene heterophasic copolymer.

17. The biaxially oriented multilayer film of claim 8, further comprising at least one metallization layer, barrier coating, and/or printable coating.

18. The biaxially oriented multilayer film of claim 1, wherein the at least 50 wt. % of high-crystalline polypropylene comprises at least 60 wt. % of high-crystalline polypropylene.

19. The biaxially oriented multilayer film of claim 1, wherein an annealing temperature of the biaxially oriented multilayer film is higher than orientation temperatures of 120° C. in machine direction and/or 165° C. in transverse direction.

20. A biaxially oriented multilayer film consisting of:
a core layer consisting of: (i) high-crystalline polypropylene;
a first tie layer on the first side and a second tie layer on the second side, wherein each of the first tie layer and the second tie layer consists of: (i) at least 90 wt. % polypropylene consisting of high crystalline polypropylene and heterophasic copolymer; and (ii) optionally, cyclic olefin copolymer and/or additives; and a first skin layer on the first tie layer and a second skin layer on the second tie layer, wherein each of the first skin layer and the second skin consists essentially of polypropylene copolymer, wherein shrinkage is less than 3.5% in a transverse direction for the biaxially oriented multilayer film after subjecting the biaxially oriented multilayer film to 135° C. for 7 min at 1 atm.

\* \* \* \* \*